(12) United States Patent
Agirman

(10) Patent No.: US 12,470,162 B2
(45) Date of Patent: Nov. 11, 2025

(54) ACTIVE CONVERTER FOR AIR CONDITIONING SYSTEMS

(71) Applicant: Carrier Corporation, Palm Beach Gardens, FL (US)

(72) Inventor: Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 456 days.

(21) Appl. No.: 17/954,505

(22) Filed: Sep. 28, 2022

(65) Prior Publication Data

US 2023/0101287 A1    Mar. 30, 2023

Related U.S. Application Data

(60) Provisional application No. 63/250,490, filed on Sep. 30, 2021.

(51) Int. Cl.
| | | |
|---|---|---|
| *H02P 1/24* | (2006.01) | |
| *H02M 1/00* | (2006.01) | |
| *H02P 1/42* | (2006.01) | |
| *H02P 3/18* | (2006.01) | |
| *H02P 27/06* | (2006.01) | |

(52) U.S. Cl.
CPC ............ *H02P 27/06* (2013.01); *H02M 1/007* (2021.05)

(58) Field of Classification Search
CPC ............................... H02P 27/06; H02M 1/007
USPC ........................................................ 318/727
See application file for complete search history.

(56) References Cited

U.S. PATENT DOCUMENTS

| | | | | |
|---|---|---|---|---|
| 2002/0190695 A1* | 12/2002 | Wall | ........................ | H02J 1/10 322/17 |
| 2004/0257029 A1* | 12/2004 | Sakamoto | ............ | G01R 31/343 318/802 |
| 2008/0115512 A1* | 5/2008 | Rizzo | ................. | B60H 1/00428 62/134 |
| 2011/0215614 A1* | 9/2011 | Mani | .................... | B62D 29/008 29/897.2 |

(Continued)

FOREIGN PATENT DOCUMENTS

| | | |
|---|---|---|
| EP | 2164161 A2 | 3/2010 |
| EP | 3672055 A1 | 6/2020 |
| WO | 2020039579 A1 | 2/2020 |

OTHER PUBLICATIONS

Author Unknown, "Vienna Rectifier-Based, Three-Phase Power Factor Correction (PFC) Reference Design Using C2000™ MCU", Texas Instruments Incorporated, Nov. 2016, Revised Jun. 2017, pp. 1-54.

(Continued)

*Primary Examiner* — Erick D Glass
(74) *Attorney, Agent, or Firm* — CANTOR COLBURN LLP

(57) ABSTRACT

A converter for an air conditioning system includes a rectifier section configured to receive a multiphase, AC input voltage; a voltage regulator section coupled to the rectifier section, the voltage regulator section configured to control a DC output voltage across a positive DC bus and a negative DC bus; and a controller in communication with the rectifier section and the voltage regulator section, the controller configured to control the converter in a first mode or a second mode in response to a transient detected in the converter.

14 Claims, 6 Drawing Sheets

(56) References Cited

U.S. PATENT DOCUMENTS

2015/0377203 A1* 12/2015 Neet ...................... F02N 11/04
290/31

OTHER PUBLICATIONS

Hartmann, Michael; "Digital Current Controller for a 1 MHz, 10 kW Three-Phase VIENNA Rectifier", IEEE Transactions on Power Electronics, vol. 24, No. 11, Nov. 2009, pp. 2496-2508.
European Search Report for Application No. 22198860.3; Issued Feb. 15, 2023; 8 Pages.

* cited by examiner

ACTIVE CONVERTER FOR AIR CONDITIONING SYSTEMS

CROSS-REFERENCE TO RELATED APPLICATIONS

This application claims the benefit of Provisional Application No. 63/250,490 filed Sep. 30, 2021, the disclosure of which is incorporated herein by reference in its entirety.

BACKGROUND

Exemplary embodiments of this disclosure pertain to the art of alternating current (AC) to direct current (DC) converters, and more specifically, to an active AC-DC converter for an air conditioning system.

Air conditioning systems often employ an AC-DC converter to convert multiphase, AC input voltage (main or grid power) to a DC voltage. The DC voltage is then supplied to an inverter to produce a multiphase, AC output voltage. The multiphase, AC output voltage is provided to a multiphase motor that drives components of the air conditioning system, such as a compressor.

BRIEF DESCRIPTION

According to an embodiment, a converter for an air conditioning system includes a rectifier section configured to receive a multiphase, AC input voltage; a voltage regulator section coupled to the rectifier section, the voltage regulator section configured to control a DC output voltage across a positive DC bus and a negative DC bus; and a controller in communication with the rectifier section and the voltage regulator section, the controller configured to control the converter in a first mode or a second mode in response to a transient detected in the converter In addition to one or more of the features described herein, or as an alternative, further embodiments may include wherein the rectifier section includes a rectifier leg including a pair of switches and a diode in parallel with each switch of the pair of switches.

In addition to one or more of the features described herein, or as an alternative, further embodiments may include wherein the first mode includes active switching of the pair of switches and the second mode includes opening the pair of switches to define a diode bridge.

In addition to one or more of the features described herein, or as an alternative, further embodiments may include wherein the controller operates the converter in the first mode when a load on the air conditioning system is less than a threshold.

In addition to one or more of the features described herein, or as an alternative, further embodiments may include wherein the controller operates the converter in the second mode when the transient is detected in at least one phase of the multiphase, AC input voltage.

In addition to one or more of the features described herein, or as an alternative, further embodiments may include wherein the controller operates the converter in the second mode when the transient is detected at a neutral point between the positive DC bus and the negative DC bus.

In addition to one or more of the features described herein, or as an alternative, further embodiments may include wherein the controller operates the converter in the second mode when the transient is detected as a high AC line condition in at least one phase of the multiphase, AC input voltage.

In addition to one or more of the features described herein, or as an alternative, further embodiments may include wherein the rectifier section includes a plurality of rectifier legs, each rectifier leg including a first switch connected to the positive DC bus and a second switch connected to the negative DC bus, a first diode in parallel with the first switch and a second diode in parallel with the second switch.

In addition to one or more of the features described herein, or as an alternative, further embodiments may include wherein the controller initiates a dead time in the first mode, wherein during the dead time a switch of the rectifier section and a corresponding switch of the voltage regulator section are turned off.

According to another embodiment, an air conditioning system includes a compressor, condenser and evaporator; an inverter providing a multiphase, AC output voltage to the compressor; a converter configured to generate a DC output voltage across a positive DC bus and a negative DC bus, the DC output voltage supplied to the inverter; the converter including: a rectifier section configured to receive a multiphase, AC input voltage; a voltage regulator section coupled to the rectifier section, the voltage regulator section configured to control a DC output voltage across a positive DC bus and a negative DC bus; and a controller in communication with the rectifier section and the voltage regulator section, the controller configured to control the converter in a first mode or a second mode in response to a transient detected in the converter.

According to another embodiment, a method of controlling a converter in an air conditioning system includes initiating operation of the air conditioning system; initiating operation of a converter providing power to the air conditioning system; monitoring for a transient in the converter; operating the converter in one of a first mode and a second mode in response to detecting the transient in the converter.

In addition to one or more of the features described herein, or as an alternative, further embodiments may include wherein the converter operates in the first mode when a load on the air conditioning system is less than a threshold.

In addition to one or more of the features described herein, or as an alternative, further embodiments may include wherein the converter operates in the second mode when the transient is detected in at least one phase of a multiphase, AC input voltage.

In addition to one or more of the features described herein, or as an alternative, further embodiments may include wherein the converter operates in the second mode when the transient is detected at a neutral point between a positive DC bus and a negative DC bus of the converter.

In addition to one or more of the features described herein, or as an alternative, further embodiments may include wherein the converter operates in the second mode when the transient is detected as a high AC line condition in at least one phase of the multiphase, AC input voltage.

In addition to one or more of the features described herein, or as an alternative, further embodiments may include initiating a dead time in the first mode, wherein during the dead time a switch of a rectifier section of the converter and a corresponding switch of a voltage regulator section of the converter are turned off.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
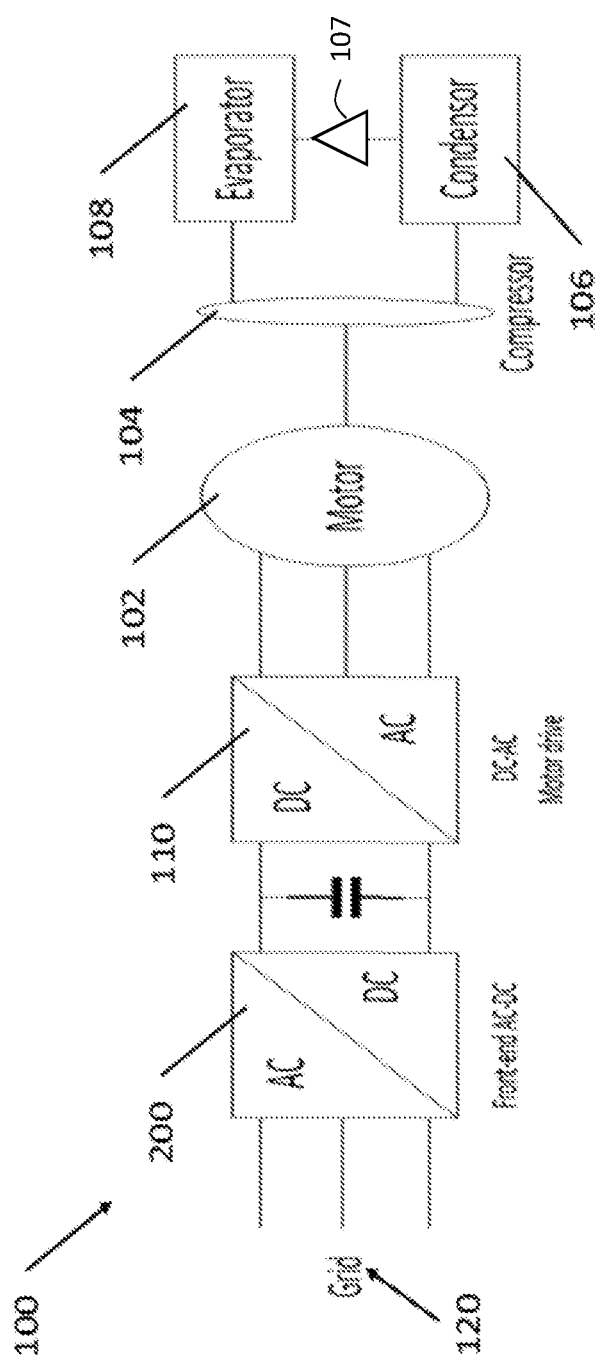
FIG. 1 is a block diagram of an air conditioning system in an example embodiment.

FIG. 1 is a block diagram of air conditioning system 100 in an example embodiment. The air conditioning system 100 may be configured to condition air in a building, such as a chiller, roof top unit, heat pump, etc. The air conditioning system 100 may be configured to condition air for refrigerated environments, such as a refrigerated container, a refrigerated trailer, refrigerator/freezer, etc.

The air conditioning system 100 includes a variable speed motor 102 that is coupled to a compressor 104. The compressor 104 includes an impeller/rotor that rotates and compresses liquid refrigerant to a superheated refrigerant vapor for delivery to a condenser 106. In the condenser 106, the refrigerant vapor is liquefied at high pressure and rejects heat (e.g., to the outside air via a condenser fan in an air-cooled application). The liquid refrigerant exiting condenser 106 is delivered to an evaporator 108 through an expansion valve 107. The refrigerant passes through the expansion valve 107 where a pressure drop causes the high-pressure liquid refrigerant to achieve a lower pressure combination of liquid and vapor. As fluid passes the evaporator 108, the low-pressure liquid refrigerant evaporates, absorbing heat from the fluid, thereby cooling the fluid and evaporating the refrigerant. The low-pressure refrigerant is again delivered to compressor 104 where it is compressed to a high-pressure, high temperature gas, and delivered to condenser 106 to start the refrigeration cycle again. It is to be appreciated that while a specific air conditioning system is shown in FIG. 1, the present teachings are applicable to any air conditioning system.

As shown in FIG. 1, the compressor 104 driven by a variable speed motor 102 from power supplied from a multiphase, AC input voltage 120 (grid or mains) through an AC-DC converter 200 and a DC-AC inverter 110. The inverter 110 includes solid-state electronics to produce multiphase, AC output voltage. In an embodiment, inverter 110 converts the DC voltage from the converter 200 into a multiphase, AC output voltage, at a desired frequency and/or magnitude in order to drive the multiphase motor 102. Such inverters 110 are known in the art.

Figure 2:
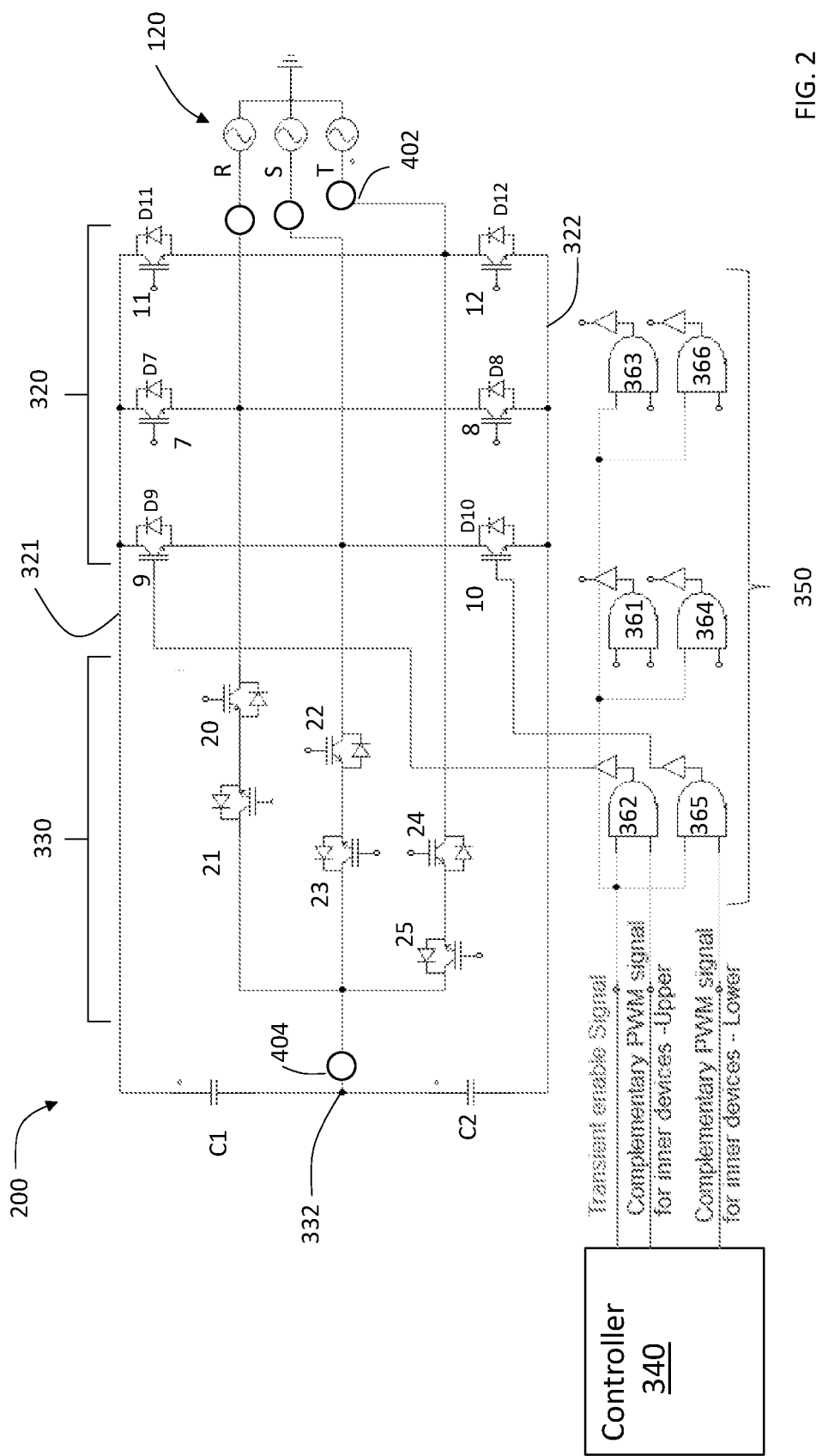
FIG. 2 is a schematic diagram of a converter in an example embodiment.

FIG. 2 is a schematic diagram of a converter 200, along with the multiphase, AC input voltage 120 in an example embodiment. The converter 200 includes a rectifier section 320 having a plurality of rectifier legs. The number of rectifier legs equals the number of phases of the AC input voltage 120, shown as phases R, S and T, at the input to the rectifier section 320. Each rectifier leg includes a pair of switches, with a diode in parallel with each switch. As shown in FIG. 2, switches 7 and 8 define a first rectifier leg, switches 9 and 10 define a second rectifier leg and switches 11 and 12 define a third rectifier leg. Diodes D7-D12 are connected in parallel across switches 7-12, respectively. The cathode of diode D7 is connected to a positive DC bus 321, the anode of diode D7 is connected to phase R of the multiphase, AC input voltage 120, the cathode of diode D8 is connected to phase R of the multiphase, AC input voltage 120 and the anode of diode D8 is connected to a negative DC bus 322. Diodes D9-D12 are arranged in a similar manner, with respect to switches 9-12 and phases S and T of the multiphase, AC input voltage 120. Switches 7-12 can be any type of switch including, but not limited to, an insulated gate bipolar transistor (IGBT) or a metal-oxide-semiconductor field effect transistor (MOSFET).

The converter 200 includes a voltage regulator section 330 having a plurality of voltage regulator legs. The number of voltage regulator legs equals the number of phases of the multiphase, AC input voltage 120, shown as phases R, S and T at the input to the voltage regulator section 330. Each voltage regulator leg includes a pair of switches. As shown in FIG. 2, switches 20 and 21 define a first voltage regulator leg, switches 22 and 23 define a second voltage regulator rectifier leg and switches 24 and 25 define a third voltage regulator leg. Switches 20-25 can be any type of switch including, but not limited to, an insulated gate bipolar transistor (IGBT) or a metal-oxide-semiconductor field effect transistor (MOSFET). The first, second and third voltage regulator legs regulate voltage on the positive DC bus 321, the negative DC bus 322 and a neutral point 332 between the positive DC bus 321 and the negative DC bus 322. A capacitor C1 is connected between the positive DC bus 321 and the neutral point 332. A capacitor C2 is connected between the negative DC bus 322 and the neutral point 332. Capacitors C1 and C2 provide for filtering and smoothing of the DC voltage on the positive DC bus 321 and the negative DC bus 322.

A controller 340 monitors one or more parameters of the converter 200 and control switches 7-12 and switches 20-25 accordingly. The controller 340 may be implemented using a general-purpose microprocessor executing a computer program stored on a storage medium to perform the operations described herein. Alternatively, the controller 340 may be implemented in hardware (e.g., ASIC, FPGA) or in a combination of hardware/software. The controller 340 may also be part of an air conditioning control system.

The controller 340 provides control signals to switches 7-12 of the rectifier section 320 and switches 20-25 of the voltage regulator section 330. The control signals may be pulse width modulation (PWM) signals, as known in the art. FIG. 2 depicts a drive unit 350 for the rectifier section 320. The controller 340 generates control signals for switches 7, 9 and 11 (referred to as upper devices) and control signals for switches 8, 10 and 12 (referred to as lower devices). Control signals for switches 7, 9 and 11 are supplied to AND gates 361, 362 and 363, respectively. Control signals for switches 8, 10 and 12 are supplied to AND gates 364, 365 and 366, respectively. A gate driver is positioned at the output of each AND gate to drive the various switches 7-12.

The second input to AND gates 361-366 is a transient enable signal produced by the controller 340. When the transient enable signal has a first value (e.g., a logic 1), the AND gates 361-366 allow transmission of the control signals to switches 7-12, corresponding to a first mode of operation.

Figure 3:
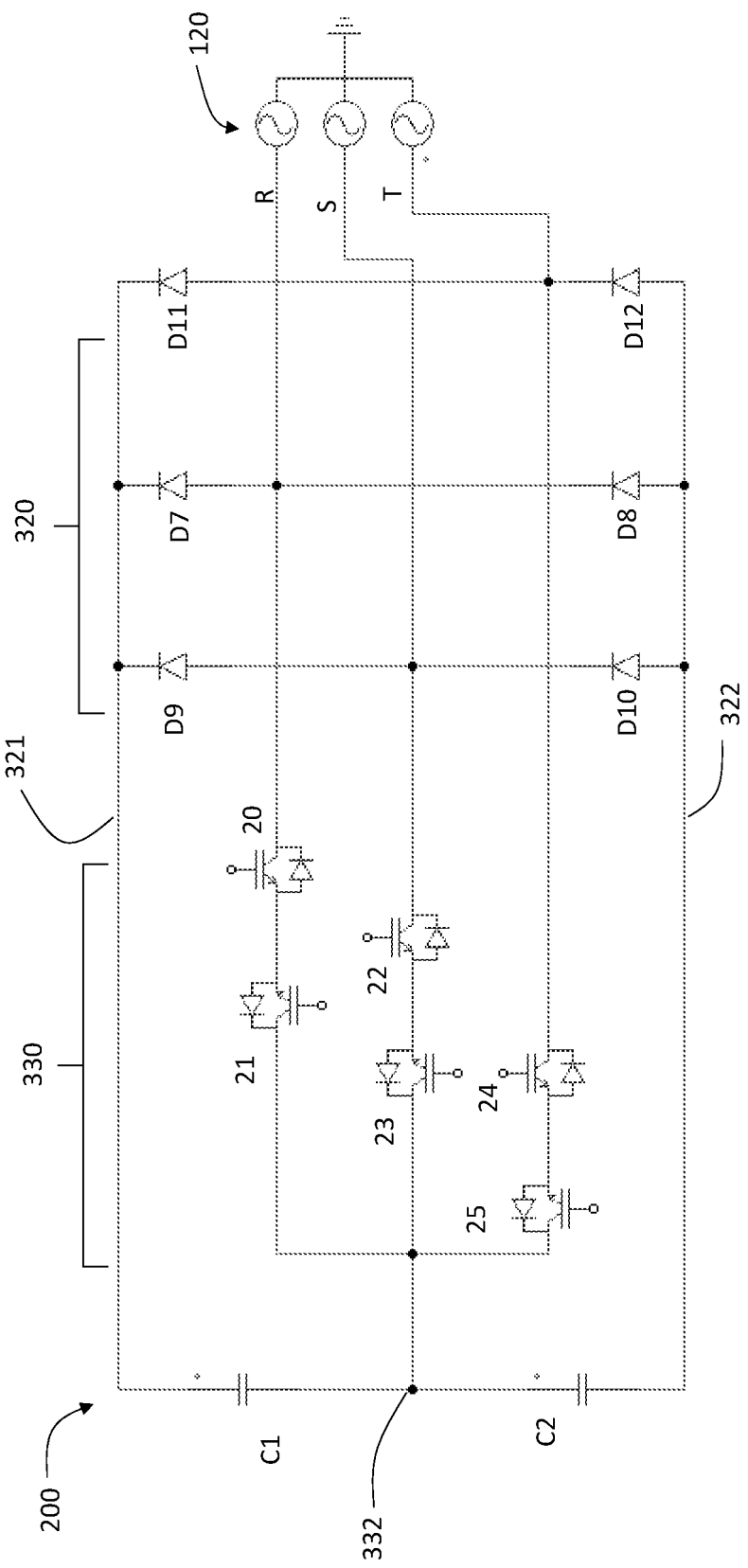
FIG. 3 is a schematic diagram of the converter of FIG. 2 operating in a second mode in an example embodiment.

When the transient enable signal has a second value (e.g., a logic 0), the AND gates 361-366 prevent transmission of the control signals to switches 7-12, corresponding to a second mode of operation. When the transient enable signal has the second value, switches 7-12 are open. In the second mode, the converter 200 operates as a Vienna rectifier and the rectifier section 320 is configured as a diode bridge. FIG. 3 is a schematic diagram of the converter of FIG. 2 operating in a second mode in an example embodiment.

The output DC voltage of the converter 200 is provided across the positive DC bus 321 and the negative DC bus 322. The output DC voltage of the converter 200 is provided to the inverter 110. The inverter 110 may be implemented using known multilevel, multiphase inverter topologies (e.g., a 3 level, multiphase, T-type inverter). The output of the inverter 110 is a multiphase, AC output voltage which is provided to the phase windings of the motor 102. The inverter 110 may be controlled by the controller 340 using known signaling (e.g., PWM control).

The controller 340 operates the converter 200 in the first mode or the second mode in response to the presence or absence of one or more transients. The controller 340 may monitor electrical parameters of the converter 200 to determine the presence of a transient. Referring to FIG. 2, one or more sensors may be used to detect transients at the converter 200. Sensors 402 monitor for transients in one or more phases of the multiphase, AC input voltage 120. Sensors 402 are in communication with the controller 340 (e.g., via wired or wireless communication). A transient in one or more phases of the multiphase, AC input voltage 120 may be indicated by an unacceptable variance in the voltage of one or more phases of the multiphase, AC input voltage 120. Sensor 404 monitors for transients at the neutral point 332 between the positive DC bus 321 and the negative DC bus 322. Sensor 404 is in communication with the controller 340 (e.g., via wired or wireless communication). A transient at the neutral point 332 may be indicated by an unacceptable voltage at the neutral point 332 (e.g., +/−1 volt deviation from zero volts). A transient at the neutral point 332 may be indicated by voltage that is not greater than +/−5% of nominal voltage levels at each of the positive DC bus 321 and the negative DC bus 322. A transient can also be triggered by a high AC line condition at AC input voltage 120 where non-unity power factor control of the full/four quadrant mode rectification (e.g., the first mode of operation) will be enabled to ride through this high line condition.

Figure 4:
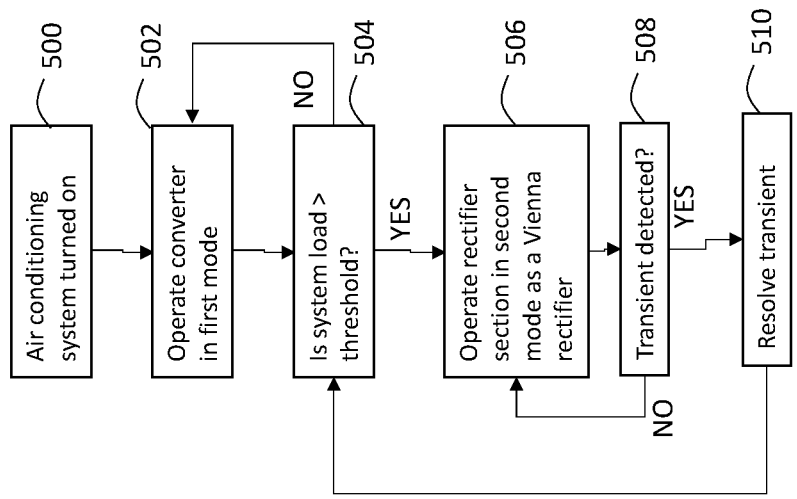
FIG. 4 is a flowchart of a process for controlling a converter in an example embodiment.

FIG. 4 is a flowchart of a process for controlling the converter 200 in an example embodiment. The process begins at 500 when the air conditioning system is turned on and the converter 200 begins generating DC power by regulating the DC bus at a fixed, predetermined value under control of controller 340 and utilizing switches 7-12 and switches 20-25. The fixed, predetermined value may be based on an expected AC input voltage 120. At 502, the controller 340 provides control signals to switches 7-12 of the rectifier section 320 and switches 20-25 of the voltage regulator section 330 to operate in the first mode. The first mode provides full quadrant switching in the rectifier section 320 during initial startup and light load operation. In the first mode, the transient enable signal has a first value (e.g., logic 1, or, equivalently, enabling all of switches 7-12 and switches 20-25).

At 504, the controller 340 determines if the load on the air conditioning system 100 is greater than a threshold. The threshold may be represented as a percentage, such as 10-15% of maximum load of the air conditioning system 100. The load on the air conditioning system 100 may be determined in response to one or more parameters of the air conditioning system 100, such as one or more of motor 102 current, motor 102 voltage, compressor 104 speed, compressor 104 discharge pressure, etc.

At 504, if the load on the air conditioning system 100 is below the threshold, the process returns to 502 to continue to operate the rectifier section 320 in the first mode. At 504, if the load on the air conditioning system 100 is greater than the threshold, flow proceeds to 506, where the controller 340 opens switches 7-12 to operate the converter 200 in the second mode. The second mode of rectification uses diodes D7-D12 as a passive, bridge rectifier as a Vienna rectifier. In the second mode, the transient enable signal has a second value (e.g., logic 0) turning off switches 7-12.

From 506, the process flows to 508 where the controller 340 monitors the converter 200 for a transient. As discussed above, a transient may be detected in one or more phases of the multiphase, AC input voltage 120 and/or at the neutral point 332. If no transient is detected at 508, the process reverts to 506 where the converter continues to operate in the second mode.

If a transient is detected at 508, flow proceeds to 510 where the controller 340 operates the converter 200 to resolve the transient. If the transient is a detected in one or more phases of the multiphase, AC input voltage 120, the controller 340 sets the transient enable signal to the first value and provides unipolar or bipolar control signals to one or more of switches 7-12 and 20-25 to accommodate for the transient in one or more phases of the multiphase, AC input voltage 120. If the transient is a detected at the neutral point 332, the controller 340 sets the transient enable signal to the first value and provides bipolar control signals to one or more of switches 7-12 and 20-25 to accommodate for the transient at the neutral point 332. Once the transient is resolved, flow reverts to 504. The control process continues until the air conditioning system is turned off and the converter 200 is deactivated.

During operation in the first mode of operation, a dead time is initiated by the controller 340. Certain pairs of switches 7-12 and 20-25 cannot be conductive at the same time. For example, referring to the R phase, switches 7 and 20 cannot be conductive at the same time and switches 8 and 21 cannot be conductive at the same time. To facilitate operation in the first mode of operation, controller 340 will turn off switches 7 and 20 and turn off switches 8 and 21 for a period of time, referred to as a dead time. This prevents undesirable current flow in the converter 200. Switches associated with phases R, S and T will also be turned off during the dead time. The dead time is a requirement for the full/four quadrant mode of operation (i.e., the first mode), for example between switch 20 and switch 7 and switch 21 and switch 8 of phase R. A similar dead time is used in the first mode on switches in the S and T phases. In the second mode (i.e., Vienna mode), as switches in the rectifier section 320 are disabled, the dead time is not needed. This provides a performance improvement to eliminate the dead time from the IGBT gating signal in this second mode to deliver smoother AC current waveforms.

Figure 5:
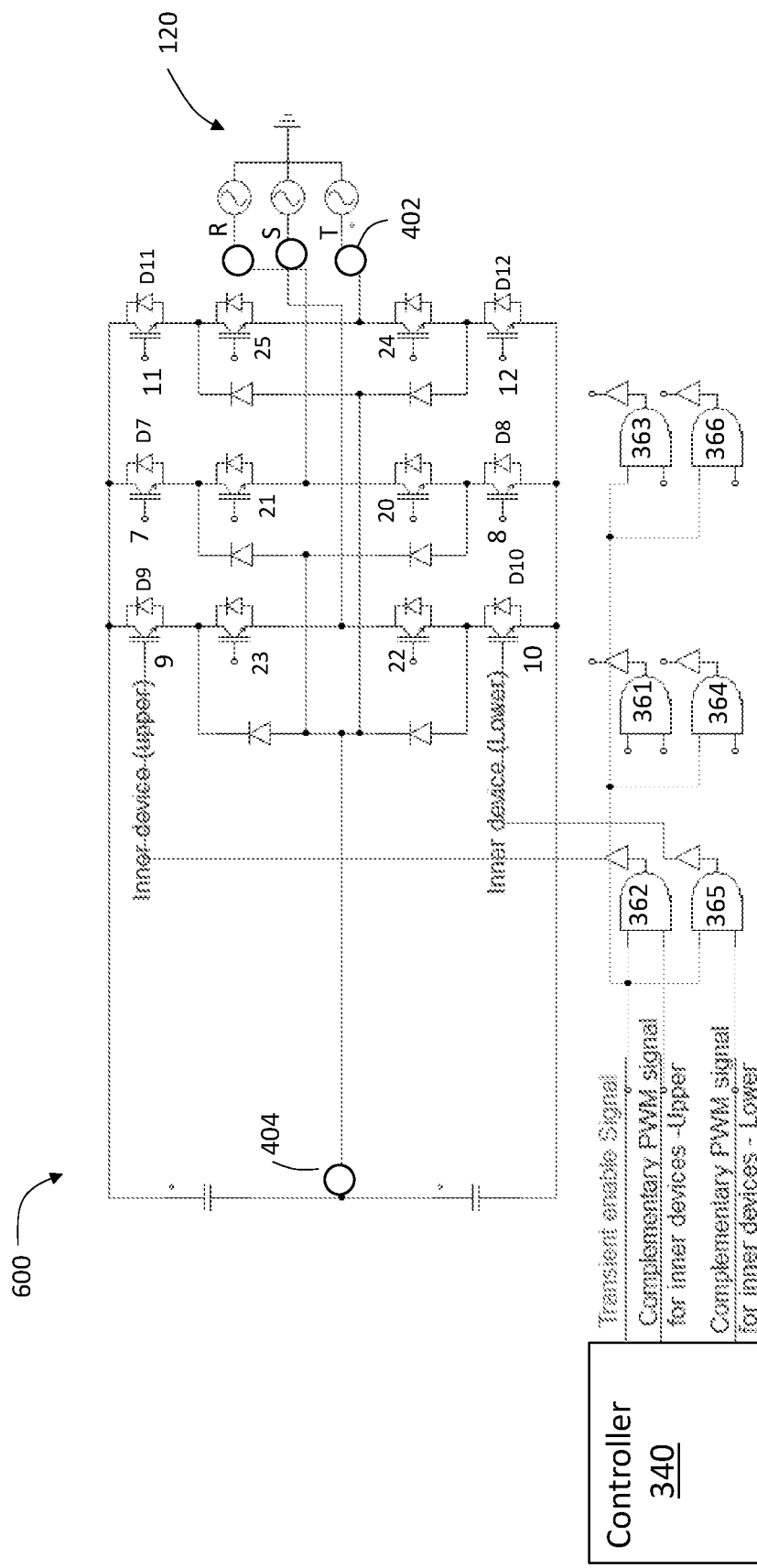
FIG. 5 is a schematic diagram of a converter in another example embodiment.

FIG. 5 is a schematic diagram of a converter 600 in another example embodiment. The converter 600 employs an I-type topology, whereas the converter 200 of FIG. 2 employs a T-type topology. Other than the topology, the converter 600 and converter 200 are operated in a similar manner. That is, converter 600 may operate in a first mode or a second mode under control of controller 340 as discussed above with reference to FIG. 4.

Figure 6:
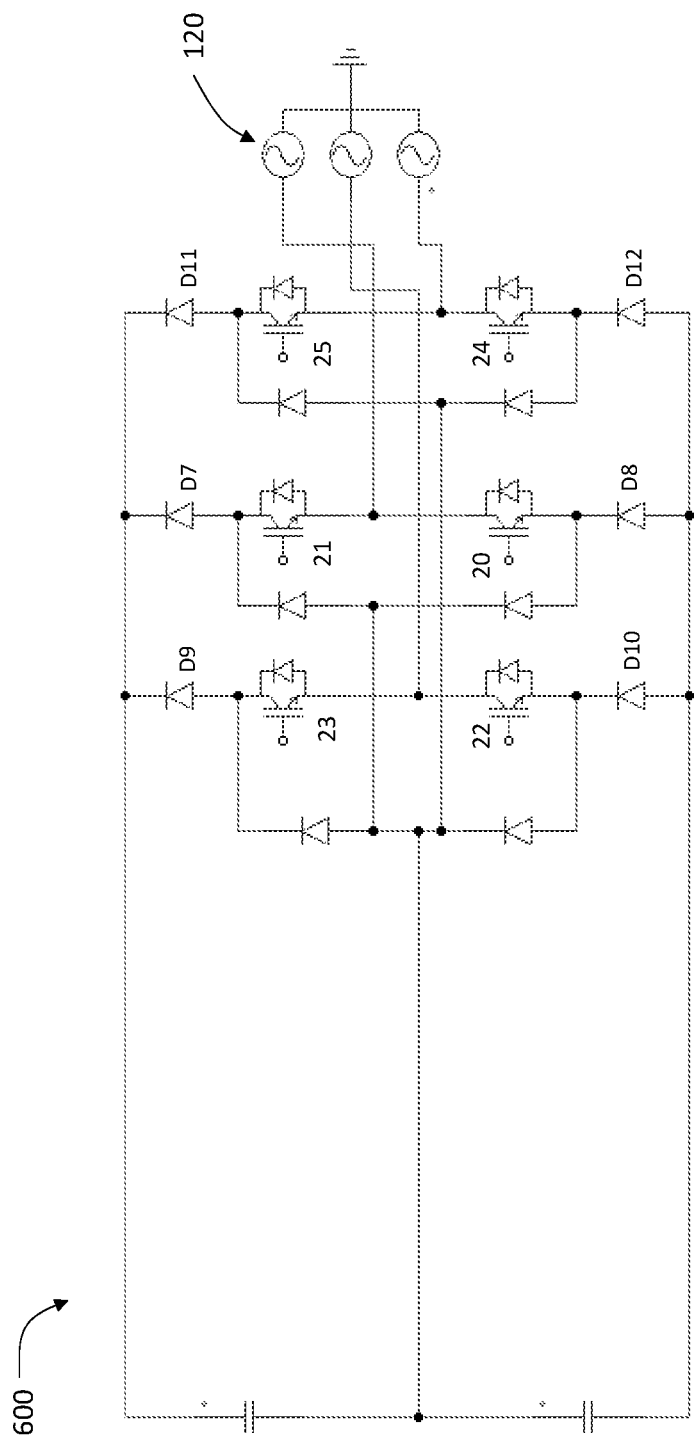
FIG. 6 is a schematic diagram of the converter of FIG. 5 operating in a second mode in an example embodiment.

FIG. 6 is a schematic diagram of the converter of FIG. 5 operating in a second mode in an example embodiment. In the second mode, the converter 600 operates as a Vienna rectifier.

Embodiments provide benefits of an active switching converter during low load conditions or in the presence of transients. The converter operates as a passive rectifier (e.g., a Vienna rectifier) when appropriate to reduce switching losses.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A converter for an air conditioning system, the converter comprising:
    a rectifier section configured to receive a multiphase, AC input voltage;
    a voltage regulator section coupled to the rectifier section, the voltage regulator section configured to control a DC output voltage across a positive DC bus and a negative DC bus; and
    a controller in communication with the rectifier section and the voltage regulator section, the controller configured to control the converter in a first mode or a second mode in response to a transient detected in the converter;
    wherein the rectifier section includes a rectifier leg including a pair of switches and a diode in parallel with each switch of the pair of switches;
    wherein the first mode includes active switching of the pair of switches and the second mode includes opening the pair of switches to define a diode bridge.

2. The converter of claim 1, wherein the controller operates the converter in the first mode when a load on the air conditioning system is less than a threshold.

3. The converter of claim 1, wherein the controller operates the converter in the second-first mode when the transient is detected in at least one phase of the multiphase, AC input voltage.

4. The converter of claim 1, wherein the controller operates the converter in the first mode when the transient is detected at a neutral point between the positive DC bus and the negative DC bus.

5. The converter of claim 1, wherein the controller operates the converter in the first mode when the transient is detected as a high AC line condition in at least one phase of the multiphase, AC input voltage.

6. The converter of claim 1, wherein the rectifier section includes a plurality of rectifier legs, each rectifier leg including a first switch connected to the positive DC bus and a second switch connected to the negative DC bus, a first diode in parallel with the first switch and a second diode in parallel with the second switch.

7. The converter of claim 1, wherein the controller initiates a dead time in the first mode, wherein during the dead time a switch of the rectifier section and a corresponding switch of the voltage regulator section are turned off.

8. An air conditioning system comprising:
    a compressor, condenser and evaporator;
    an inverter providing a multiphase, AC output voltage to the compressor;
    a converter configured to generate a DC output voltage across a positive DC bus and a negative DC bus, the DC output voltage supplied to the inverter;
    the converter including:
    a rectifier section configured to receive a multiphase, AC input voltage;
    a voltage regulator section coupled to the rectifier section, the voltage regulator section configured to control a DC output voltage across a positive DC bus and a negative DC bus; and
    a controller in communication with the rectifier section and the voltage regulator section, the controller configured to control the converter in a first mode or a second mode in response to a transient detected in the converter;
    wherein the rectifier section includes a rectifier leg including a pair of switches and a diode in parallel with each switch of the pair of switches;
    wherein the first mode includes active switching of the pair of switches and the second mode includes opening the pair of switches to define a diode bridge.

9. A method of controlling a converter in an air conditioning system, the method comprising:
    initiating operation of the air conditioning system;
    initiating operation of a converter providing power to the air conditioning system, the converter including;
    a rectifier section configured to receive a multiphase, AC input voltage;
    a voltage regulator section coupled to the rectifier section, the voltage regulator section configured to control a DC output voltage across a positive DC bus and a negative DC bus; and
    a controller in communication with the rectifier section and the voltage regulator section, the controller configured to control the converter in a first mode or a second mode in response to a transient detected in the converter monitoring for a transient in the converter;
    operating the converter in one of a first mode and a second mode in response to detecting the transient in the converter;
    wherein the rectifier section includes a rectifier leg including a pair of switches and a diode in parallel with each switch of the pair of switches;

wherein the first mode includes active switching of the pair of switches and the second mode includes opening the pair of switches to define a diode bridge.

10. The method of claim 9, wherein the converter operates in the first mode when a load on the air conditioning system is less than a threshold.

11. The method of claim 9, wherein the converter operates in the first second mode when the transient is detected in at least one phase of a multiphase, AC input voltage.

12. The method of claim 9, wherein the converter operates in the first mode when the transient is detected at a neutral point between a positive DC bus and a negative DC bus of the converter.

13. The method of claim 9, wherein the converter operates in the first mode when the transient is detected as a high AC line condition in at least one phase of the multiphase, AC input voltage.

14. The method of claim 9, further comprising initiating a dead time in the first mode, wherein during the dead time a switch of a rectifier section of the converter and a corresponding switch of a voltage regulator section of the converter are turned off.

\* \* \* \* \*